Dec. 27, 1960    O. MITCHELL    2,966,044
REGULATOR FOR FLOW-RESPONSIVE REFRIGERATION VALVE
Filed Dec. 21, 1956    3 Sheets-Sheet 1
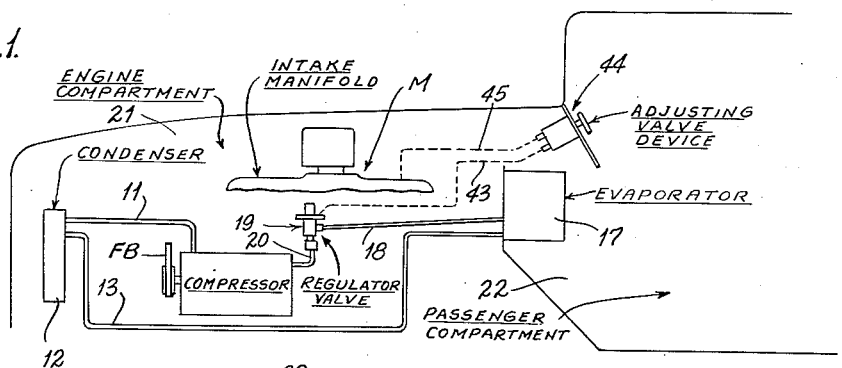
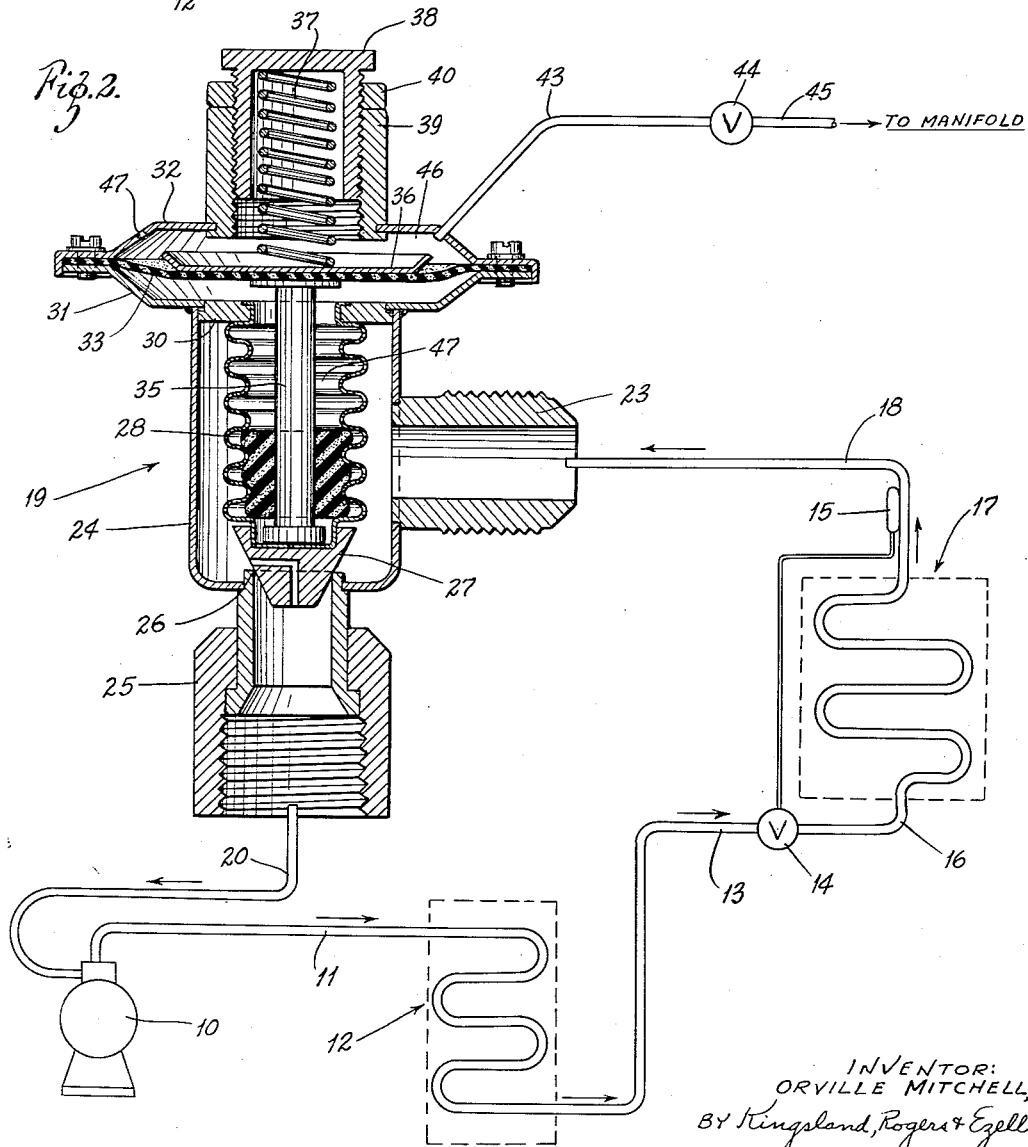
INVENTOR:
ORVILLE MITCHELL,
BY Kingsland, Rogers & Ezell
ATTORNEYS Dec. 27, 1960    O. MITCHELL    2,966,044
REGULATOR FOR FLOW-RESPONSIVE REFRIGERATION VALVE
Filed Dec. 21, 1956    3 Sheets-Sheet 2

INVENTOR:
ORVILLE MITCHELL,
BY Kingsland, Rogers & Ezell
ATTORNEYS

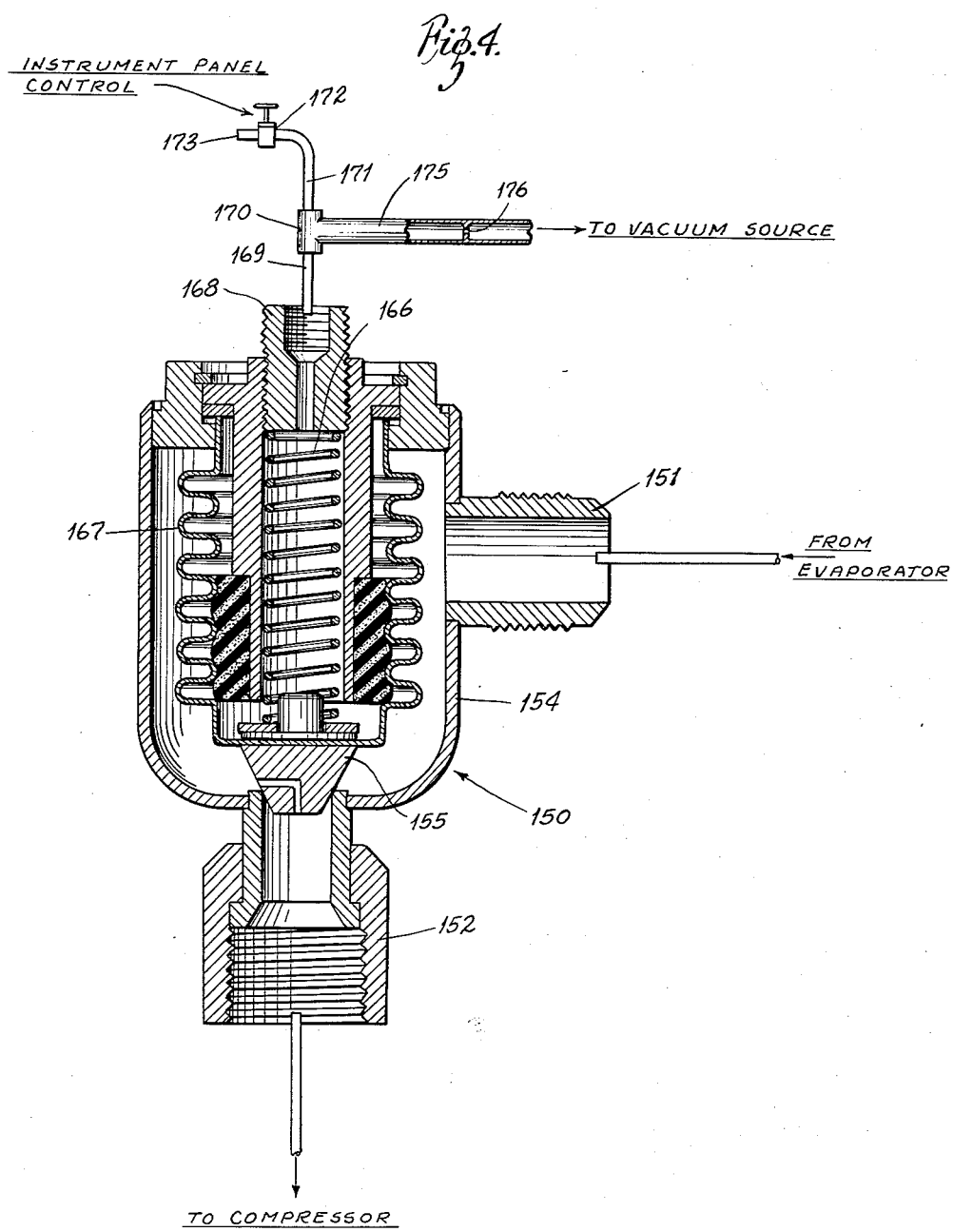

United States Patent Office 2,966,044
Patented Dec. 27, 1960

2,966,044

REGULATOR FOR FLOW-RESPONSIVE REFRIGERATION VALVE

Orville Mitchell, Dallas, Tex., assignor to John E. Mitchell Company, Dallas, Tex., a corporation of Missouri Filed Dec. 21, 1956, Ser. No. 629,841

16 Claims. (Cl. 62—217)

This invention relates to a regulator for a flow-responsive refrigeration valve for use in air conditioning systems, especially those in air conditioning automobiles or other vehicles. The particular applicability to automobiles arises from the fact that the invention can regulate the refrigeration system despite variations in speed of the compressor that have no relation to the amount of refrigeration required.

In refrigeration systems of the type having a compressor, a condenser, an expansion device, and an evaporator, all in series circuit, used on automobiles or other similar vehicles, the compressor is frequently attached directly to an engine shaft to rotate therewith, so the speed of the compressor varies with the engine speed and without regard to the amount of refrigeration required. This may cause a severe over-capacity at times, and even may result in discharging ice from the evaporator into the passenger compartment or enclosure because of the over-refrigeration of the evaporator.

In general, the present invention includes a valve regulator interposed in the suction line to the compressor. The regulator includes a valve and positioning means for the valve. The positioning means comprises ordinarily a spring urging the valve closed and a pressure-responsive system or mechanism to modify the effect of the spring. The pressure responsive mechanism has one or more pressure-responsive walls connected to the valve. One of them is subjected on one side to pressure conditions in the valve housing upstream of the valve seat (which reflect evaporator pressures and rate of flow pressure drops). One of them is also subjected to an outside pressure that is selectively applied to it to act against the closing force of the spring. It thereby aids the first-named pressure, and permits the valve housing pressure to reach a lower value before the valve closes for a given spring force. The effect of this is to prevent low evaporator pressure from throttling the system when the compartment is not sufficiently cold. And regulation of the amount of the outside pressure regulates the position of the valve for given spring setting evaporator pressures and rates of flow, so that it affords mechanism to regulate the refrigeration capacity of the system, and hence to adjust the temperature in the compartment being cooled.

In a former patent of the applicant, Orville Mitchell, and Robert V. Anderson, No. 2,766,593 of October 16, 1956, there is a disclosure of a flow-responsive valve disposed as close to the compressor as possible, which valve or regulator can be set to remain closed until the pressure in the evaporator attains at least a certain minimum value, and thereafter to modulate toward and from rate of flow of the refrigerant through the valve. That closed position, primarily in response to changes in the regulator is designed to maintain evaporator pressure high enough to prevent icing due to over-capacity of the evaporator, and to throttle or unload the compressor entirely in response to sudden accelerations of the compressor that may result, for example, from sudden accelerations of the automobile.

It has been found, by the applicant, that the aforesaid Mitchell-Anderson type of regulator can be altered as previously set forth and hereinafter described in detail, so that it can have additional valuable functions. It can provide a means to regulate the refrigeration capacity of the system without changing the compressor speed, or otherwise altering the coupling between the compressor and the engine.

Also, it is an object and advantage of the present invention to provide such a capacity regulator means for the system that can be remotely located so as to be readily accessible to the occupants of the vehicle.

A second desirable major feature of the present invention is that it prevents the Mitchell-Anderson type of valve from occasionally causing under-capacity in the refrigeration system. The Mitchell-Anderson flow-responsive valve puts a minimum limit on evaporator pressure with the objective of preventing the evaporator pressure from becoming so low that ice is formed on the evaporator, that might be discharged into the enclosure. However, at times, that Mitchell-Anderson valve is caused to close when low evaporator pressure is not the result of over-capacity of the evaporator. For example, there are times when the vehicle is operated at high speed soon after it is put in use and before the air conditioning system has had time to reduce the temperature. Attendant high speed of the compressor may produce such a low pressure through the Mitchell-Anderson regulator valve that it closes, although the compartment is not yet cooled. Under such types of conditions, the regulator will be acting as if there were an over-capacity when actually there is an under-capacity. Yet if the minimum pressure setting of the regulator be lowered, then there is a greater tendency toward icing during other normal operating conditions.

The present invention overcomes that deficiency of the Mitchell-Anderson valve by providing for lowering the minimum evaporator pressure or minimum suction pressure at which the regulator closes off, when the first-named under-capacity conditions exist in the evaporator. This lowering of the minimum pressure can be produced either manually or automatically. It may be a secondary feature or advantage of the broad capacity control device, but it is also an object of this invention to provide for automatic reduction of this pressure in response to the temperature within the enclosure.

Other features and objects will appear in the description to follow.

In the drawings:

Figure 1 is a schematic view of the present invention installed in an automobile;

Figure 2 is a sectional view of the valve regulator device, with the circuit components in diagrammatic form;

Figure 4 is a sectional view of a valve regulator device like that of Figure 3, with modified circuit components in diagrammatic form.

Figure 3:
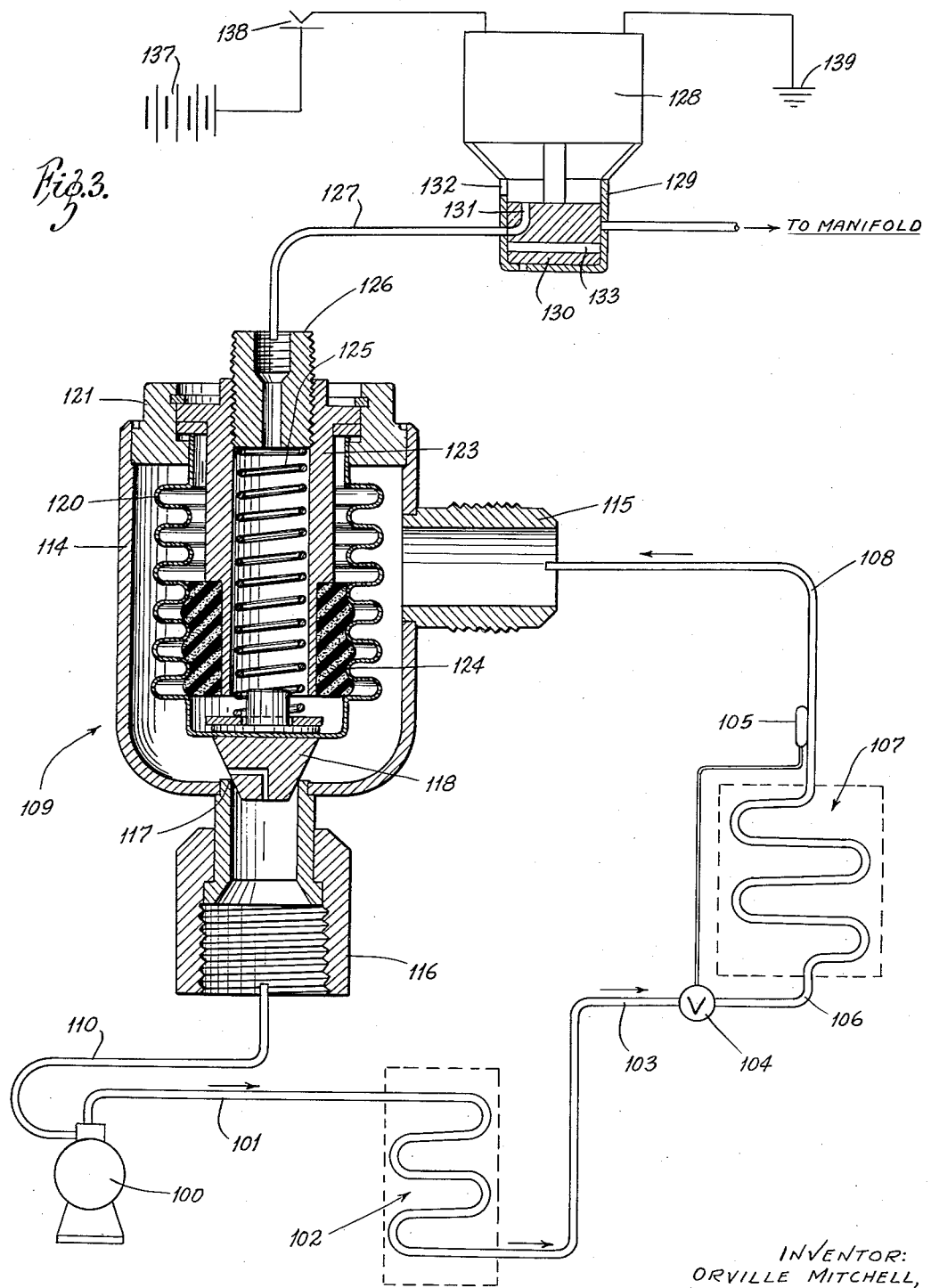
Figure 3 is a sectional view of a modified embodiment of the invention with the circuit components in diagrammatic form.

The system of Figures 1 and 2 includes a compressor 10, discharging through a high pressure pipe 11, into a condenser coil 12. The condenser, in turn is connected by a pipe 13 through an expansion device 14 which, preferably, is a constant superheat type of thermostatic expansion valve, with a bulb 15 located near the outlet of the evaporator. The expansion valve discharges through a pipe 16 into an evaporator coil 17. The evaporator coil is connected by a pipe 18 into the regulator valve 19, the details of which constitute the preferred construction of the present invention. The outlet side of the regulator valve 19 is connected by the suction pipe 20 back into the compressor.

Figure 1 shows the parts aforesaid in a typical installation in an automobile having an engine compartment 21 and a passenger compartment 22. The compressor 10 is driven from an engine shaft such as the crank or cam shaft, usually by a belt FB that also drives the fan or generator.

The condenser 12 is mounted adjacent the front of the engine compartment. The evaporator is enclosed in a casing that also contains the expansion valve, and may be located in or adjacent the passenger compartment so as to deliver cooled air thereto. The control 19 is adjacent the compressor inlet. As will appear, the control 19 includes a manual regulating valve accessible in the passenger compartment, and having tubing connection with the engine intake manifold M.

The regulator 19 has an inlet 23 opening into a housing 24. An outlet 25 connects from the housing into the pipe 20. A valve seat 26 of relatively large size, is formed between the inlet and the outlet. A tapered valve head 27 is adapted to move in and out of the valve seat 26 in varying degrees, so that it may throttle the flow through the valve seat and also may cut the flow off entirely. Preferably, this valve head is provided with a restricted bleeder passage 271 that can enable pressures to equalize during periods of inoperation of the compressor.

The valve head 27 is mounted upon the lower end of a bellows 28 which constitutes a flexible wall of an expansible pressure-responsive mechanism. The upper end of the bellows 28 is attached by a sealing ring 30 into the top of the housing 24 so that the pressures within the housing 24 are contained therein by the bellows. However, the interior of the bellows 28 opens outwardly into an outwardly flaring lower diaphragm support 31. This member 31 receives an upper diaphragm plate 32 and the two of them clamp the edge of a diaphragm 33 between them. A valve plunger pin 35 is located within the bellows 28 to transmit forces from the diaphragm 33 to the valve 27, and to transmit pressure forces from the outside of the bellows 28 to the diaphragm 33.

A buffer plate 36 rests upon the top of the diaphragm 33 and receives the lower end of a coil spring 37. The upper end of the coil spring 37 is received within an externally threaded cap 38 that, in turn, is threaded into a sleeve 39 mounted in and projecting upwardly from the top diaphragm cover 32. A lock nut 40 is provided also on the cap 38 so that, after the cap is turned in or out so as to give the pressure on the spring 37 desired for the conditions of use, the cap may be held in position by setting the nut 40.

The bellows 28, the diaphragm 33 and the chambers around and between them comprise a pressure-responsive mechanism that can receive valve housing pressures and respond thereto to open the valve against the spring, and can also receive other fluid pressures acting to supplement the effect of valve housing pressures. These last may be high pressures acting on one side of the mechanism or low pressure on the other. The latter are here preferred because intake vacuum is readily available in an automobile and sources of high pressure are not. Hence, the vacuum-type supplemental pressure adjusting arrangement will now be described.

The upper diaphragm cover 32 receives one end of a tube 43 that leads through a manually adjustable needle valve 44, and thence by a pipe 45 to the engine manifold, as a preferred source of vacuum. By this means, the engine vacuum may be transmitted to the upper diaphragm chamber 46. A small bleeder hole 47 opens through the upper diaphragm cover 32 so that a vacuum drawn through the pipe 43 from the upper diaphragm chamber 46 may be restrictedly counteracted by the intake of air through the bleeder port 47. The pressure in the chamber 46 becomes a function of the throttling position of the control valve 44, and to the pressure in the vacuum source.

Operation of Figures 1 and 2

A refrigeration system of the type illustrated operates with a closed refrigerant circuit employing a refrigerant such as Freon 12. The compressor 10 is, ordinarily, continuously connected to the engine so that its speed of operation varies with the speed of the engine and has no direct bearing upon the refrigeration requirements of the passenger compartment. The compressor 10 delivers refrigerant through the pipe 11 to the condenser 12 where the high pressure gas is condensed. From the condenser, it is delivered through the pipe 13 to the expansion valve 14. At the expansion valve, it is expanded and delivered through the pipe 16 into the evaporator coil 17. It expands in the evaporator coil extracting heat from the environment of that coil. In an automobile system, as well as most other similar systems, it is customary to force air across the cold evaporator coil and thence into the enclosure being conditioned.

The refrigerant, after taking up heat from the evaporator coil, is drawn back through the pipe 18 into the housing 24 of the valve regulator 19. Assuming the valve 19 is open, the expanded refrigerant flows through the valve 19 and returns to the compressor by the pipe 20.

As described in the Mitchell-Anderson application, the valve 27 responds to a combination of evaporator pressure and the rate of flow through the valve seat 26. As we shall explain later, the present valve responds to other factors; but at this point we will consider only those two.

If the refrigeration capacity becomes too great for the load, the liquid level in the evaporator 17 rises and the vapor pressure goes down. Also, usually, excessive refrigeration capacity follows from increase of speed of the compressor (such as during highway driving); and that increased compressor speed causes higher rate of flow through the valve seat 26, and further reduction in valve housing pressure. The foregoing results in a lower pressure acting upon the outside of the bellows 28 within the housing 24 of the valve 19, and that valve 27 moves toward its seat 26, throttling the flow through the system. This throttling action reduces the amount of refrigerant flowing through the system, and consequently reduces the refrigeration capacity of the system.

If the valve 27 closes against the seat 26, the bellows 28 thereafter is influenced only by static pressure conditions that will correspond to the pressure in the evaporator 17. As that pressure again builds up, a certain minimum value, that is predetermined according to the conditions of use, the bellows 28 again becomes compressed and the valve 27 is correspondingly withdrawn from the seat 26 to a point where the forces acting to position it are in equilibrium.

Another section of the valve 27 is one that is responsive to changes in the compressor suction pressure. A sudden acceleration of the vehicle causes a sudden increase in speed of the compressor, since they are ordinarily connected together. This suddenly decreases the suction line pressure and causes a reduction of pressure inside the housing 24 which is reflected more immediately because of the size of the valve seat 26. The pressure drop may not be accompanied by a reduction of evaporator pressure. The valve may be caused to close entirely by this sudden pressure drop, and to remain closed until the compressor speed reverts to normal. This has the advantage of substantially unloading the compressor when sudden accelerations are required of the engine, which removes the load of the refrigeration mechanism from the engine at the time its power is needed to accelerate the vehicle.

The foregoing explanations are applicable to the Mitchell-Anderson valve and system. That valve has certain disadvantages in that it does not provide any convenient means for adjusting the system capacity, and hence the temperature of the passenger compartment; and it also at times throttles capacity when the temperature is still too high. The present invention is designed to overcome both disadvantages.

The Mitchell-Anderson valve is located under the hood, and to adjust it requires resetting of the spring-adjusting screw located on the valve housing. Also, its setting is a compromise, because if it is set for a minimum pressure of, say 25 p.s.i., it may close off too soon if the compressor speeds up before the compartment is cooled. That condition may occur in midday driving when the vehicle is taken onto the highway shortly after being started. But if the setting is reduced to 17 p.s.i., it may not close off in morning and evening driving, even though ice is formed and discharged into the compartment. So a compromise is used and the valve is set for an intermediate value, such as 20 p.s.i. It may occasionally discharge ice, and it may occasionally be under-capacity, but it reduces both circumstances. The present invention affords a means to avoid both; and also, most importantly, provides an accessible adjusting regulator for the temperature of the compartment.

With the upper diaphragm chamber 46 connected to the engine manifold and the bleeder port 47 provided in the manner indicated, the valve 44 can be set to determine the pressure in the diaphragm chamber 46. Assuming that the engine manifold pressure is considerably below atmospheric pressure, and assuming that the bleeder port 47 and the tubes 43 are given the appropriate sizes, then the nearer the valve 44 is brought to its closed position, the higher is the air pressure within the diaphragm chamber 46. Since this diaphragm chamber pressure augments the pressure of the spring 37 in urging the valve 27 toward the valve seat 26, the effect then of moving the needle valve 44 toward closed position is to increase the minimum pressure at which the valve 27 opens, and to cause the valve 27, when it is modulating, to assume a position nearer to its valve seat, with the result that the quantity flowing through the system is reduced. The result of the foregoing closing of the needle valve 44 therefore is to increase the temperature in the space being refrigerated.

In the converse manner, opening the valve 44 lowers the minimum pressure at which the valve 27 opens, so that it reduces the minimum evaporator pressure permitted, and it also causes the valve 26 to open further for any given valve housing pressure conditions. Therefore, opening the valve 44 prevents premature throttling of the valve when the temperature of the compartment is still warm, and for any given valve housing pressures, it decreases the temperature in the compartment being refrigerated.

The preventing of under-capacity when the compartment is still warm may be accomplished by an on-and-off valve in place of the throttling valve 44. If the valve 44 is closed all the way, atmospheric pressure exists in the diaphragm chamber 46 and the minimum pressure setting of the valve 27 is that determined by the spring 37 alone. This minimum pressure setting may be too high for certain conditions, attendant upon a rapid pull-down of pressure by the compressor. It may be modified by opening the valve 44 wide to reduce the effective force of the spring 37 by reducing the air pressure within the chamber 46 and permitting the valve 27 to be opened at a lower evaporator pressure, or to remain open despite a greater pressure drop through the control valve 19. A cycle of the foregoing on-and-off type may also be automatically obtained as is illustrated in connection with the embodiment which will now be described.

*The embodiment of Figure 3*

Figure 3 shows a compressor 100 that is adapted to be driven from the automobile engine as before. The compressor 100 discharges into a high pressure pipe 101 that connects into a condenser 102. The outlet to the condenser 102 is connected by the pipe 103 to the expansion valve 104 that has its control bulb 105 located adjacent the outlet of the evaporator so that the expansion valve may maintain constant superheat as is known in the art. The expansion valve delivers into a pipe 106 connecting into an evaporator 107. The outlet of the evaporator discharges by a pipe 108 into the valve 109 and this valve, in turn, is connected by a pipe 110 back into the compressor 100. Details of the foregoing elements, save only for the valve 109 are not given because they are the familiar refrigeration system that is well known in the art.

The valve 109 includes a valve housing 114 with an inlet 115 and an outlet 116, as indicated. A relatively large valve seat 117 is located adjacent the outlet 116, and it is adapted to be throttled or closed by a valve head 118. In this case, the valve 118 is supported on the lower end of a bellows 120. The upper end of the bellows 120 is mounted upon a sealing ring 121 that is sealed into the top end of the valve housing 114. A cylindrical spring retainer and guide tube 123 is also mounted in the top of the sealing ring 121 and extends down in the bellows 120 to near the bottom thereof. Adjacent the bottom, it supports a foam cushion cylinder 124 that is designed to dampen vibrations of the bellows and valve.

A coil spring 125 is supported within the tube 123 so as to act downwardly upon the valve head and to act upwardly against an adjustable threaded plug 126 that is mounted in the top of the cylinder so that it can be adjusted up and down to vary the pressure of the spring. The fitting 126 is hollow and receives one end of a tube 127 that leads to the housing of a three-port solenoid valve 128. The housing 129 of the valve 128 contains a valve plug 130 that has a valve passage 131 that, in the position illustrated, connects the pipe 127 to an exhaust passage 132. The valve plug 130 also contains a through passage 133 that, when the plug 130 is elevated against the pipe 127 to the pipe 134, is connected to the engine manifold. It is evident that, when the valve is in the position shown, atmospheric pressure exists within the bellows 120, but when the valve plug 130 is elevated engine manifold pressure, which is considerably lower than atmospheric pressure, exists within the bellows 120.

The mechanism for operating the valve 128 is not illustrated in detail because it can be in the form of any one of the well known control devices, here considered to be a solenoid. The solenoid coil, when energized, elevates the core and the valve plug 130. When de-energized, any suitable means such as gravity or a spring causes the plug to fall to the position illustrated, as is known in the art.

The coil is in a circuit with the battery 137 of the automobile. One end of the battery is connected through a thermostatic switch 138 that connects to the coil, and the other end of the coil is grounded at 139. When the thermostatic switch closes to indicate a demand for refrigeration, the valve plug 130 is elevated.

*The operation of the embodiment of Figure 3*

The embodiment of Figure 3 operates very similarly to the embodiment of Figure 1, except that it does not provide the flexible means for setting the temperature of operation of the refrigeration system, because the valve 128 is illustrated as an open or closed valve rather than as a modulating valve.

Assuming at the start that the thermostat in the car demands heat, the coil 128 is energized and engine manifold vacuum produces a low pressure condition within the bellows 120. This acts in opposition to the spring 125 and sets a relatively low minimum evaporator pressure and also prevents the valve from being closed by a relatively great pressure reduction by the compressor. Consequently, the valve 118 will normally remain open, despite low evaporator pressures and high compressor pull-down.

However, if the space being cooled is at a desired temperature, the thermostatic switch 138 opens and the valve 128 assumes the position illustrated in Figure 3, wherein atmospheric pressure exists within the bellows 120. This permits the spring 125 to exert its full force and raises the minimum evaporator pressure so that the valve 118 is throttled or closed in response to reduction of evaporator pressure or great draw-down of pressure by the compressor.

*The embodiment of Figure 4*

Figure 4 shows an embodiment which can use the same flow-responsive valve as that used in one of the other figures, such as Figure 3, and it will be connected similarly in the refrigeration circuits. It is, therefore, unnecessary to describe it in complete detail. Suffice it to say that there is a control valve 150 which has an inlet 151 connecting from the evaporator and an outlet 152 to be connected into the suction side of the compressor. The inlet and outlet are connected with a valve housing 154. Flow is regulated by a valve 155 that is urged closed by a spring 166 within a bellows 167. The valve housing pressure acts on the outside of the bellows in opposition to the spring.

The interior of the bellows is connected through a fitting 168 that can be adjusted in the top of the bellows mounting to adjust the force of the spring 166. The passage through the fitting 168 connects with a pipe 169 leading to a T 170. One branch of the T is connected by a pipe 171 to some convenient place such as to the instrument panel of the vehicle. On the instrument panel is provided a valve 172 which can regulate flow from an atmospheric port 173 into the pipe 171. The valve may be a valve such as a needle valve so that fine adjustment of this atmospheric port can be obtained.

The other branch of the T connects with a pipe 175 that leads to a vacuum source, such as to the manifold of the engine. A restrictive orifice 176 can be used to restrict the amount of air that can be drawn into the vacuum source thus preventing excessive dilution of the fuel going into the engine.

*Operation of the embodiment of Figure 4*

Figure 4 is similar in its operation to Figure 1, but has certain advantages. In the embodiment of Figure 4, the manual adjustment or regulation of the pressure within the bellows 167 is based upon regulation of the inflow of atmosphere to the system, rather than being based upon the throttling of the vacuum line. The over-all operation of the refrigeration system is the same as in the previous embodiment.

The embodiment of Figure 4 has several points of greater flexibility than that of Figure 3. If the valve 172 is closed completely, then the pressure within the bellows 167 is manifold or vacuum-source pressure, whereas in the embodiment of Figure 2 the lowest pressure that can be obtained in the bellows is vacuum-source pressure minus whatever is lost through the presence of the constantly open bleeder port 47.

The constriction 176, as previously mentioned, sets a limit on the amount of air that can be drawn from atmosphere to the vacuum source, thus preventing excessive fuel dilution and also aids in smoothing out irregularities in operation of the valve 155 due to rapid fluctuations of manifold vacuum.

It is to be commented in connection with these two devices that if the connections to the engine manifold are effectively opened the pressure within the expansion chamber, whether it be within the diaphragm chamber 46 or the bellows 120, will vary as a function of engine vacuum. Since engine vacuum is at a maximum when the engine is idling, this means that a maximum rate of refrigerant flow will be obtained at idling speed, and a less rate of refrigerant flow will be obtained when the vehicle is moving. This can be desirable because it tends to compensate for decreased compressor speed during idling, and enables the operator to cool the car more readily than otherwise would be possible when the engine is first started and is idling; whereas, as the engine speeds up, the refrigeration capacity is reduced by the throttling effect on the control valves so as to tend to, or actually to, compensate for increased compressor speed.

In connection with this invention, it is noted that the vacuum booster for the regulator valve constitutes a mechanism to increase and decrease the opening forces on the valve that can be remotely operated by the separate device 44 that admits or releases an additional energizing medium to the actuatable means. The use of a pneumatic, vacuum-type opening-force-applying means is preferred to other known types of such mechanisms that are remotely adjustable, but other types may be used at the sacrifice of some of the advantages here set forth.

What is claimed is:

1. In a refrigeration system: a compressor, a condenser, an expansion device, an evaporator, and piping connecting them all in circuit; a regulating valve in the piping between the evaporator and the compressor; means to regulate the position of the valve, including means responsive to evaporator pressure to apply force urging the valve open as that pressure increases, resilient means urging the valve toward closed position; and fluid pressure operated means to increase the opening forces on the valve, including a source of fluid at predetermined pressures different from the evaporator pressures, a pressure chamber having a movable wall connected to the valve, and means to control connection of the source of fluid to the chamber.

2. The combination of claim 1 wherein the chamber is connected to atmosphere and to the previously mentioned source of pressure which is other than atmosphere, and the control means regulates one of said connections.

3. The combination of claim 2 wherein the system is mounted upon an internal combustion engine-driven vehicle, and wherein the source of pressure other than atmosphere is engine manifold vacuum.

4. The combination of claim 2 wherein the control means comprises a valve movable into a plurality of throttling positions, to vary the pressure in the chamber.

5. The combination of claim 1 wherein the control means includes a valve, a device responsive to temperature in the space being refrigerated, and means operated by the device to open and close the valve.

6. In a refrigeration system: a compressor, a condenser, an expansion device, an evaporator, and piping connecting them all in circuit; a regulating valve in the piping between the evaporator and the compressor; means to regulate the position of the valve, including means responsive to evaporator pressure to apply force urging the valve open as that pressure increases, resilient means urging the valve toward closed position; means actuatable to apply additional opening forces to the valve, and releasable to reduce said opening forces, including a source of variable fluid pressure, control means to conduct the fluid to and from the actuatable means to urge it to be opened as the variable fluid pressure decreases and closed as the same increases, said control means being separate from the valve and having conducting elements between it, the valve, and the source of the fluid pressure.

7. In a refrigeration system: a compressor, a condenser, an expansion device, an evaporator, and piping connecting them all in circuit; a regulating valve in the piping between the evaporator and the compressor; means to regulate the position of the valve, the regulating valve having a valve housing with an inlet, an outlet, and a valve seat between them, the valve moving toward and from the valve seat, the valve seat and valve being large relatively to the inlet so that the pressure within the valve housing may respond quickly to changes in compressor suction pressure; a movable wall connected to the valve to operate it, the wall being subjected to valve housing pressure, to move the valve openward as the housing pressure increases, resilient force means oppositely acting on the valve; and fluid pressure means acting to apply additional opening forces on the valve, including a tube for connection to a source of vacuum, a valve in the tube, an expansible pressure chamber into which the tube opens, containing the movable wall so as to apply added opening forces to the valve varying with increasing vacuum in the chamber, and an atmosphere port from the pressure chamber.

8. A refrigeration control valve, including a housing having an inlet, an outlet, a valve seat between them, and a valve movable toward and from the valve seat; the outlet and the valve seat being at least substantially as large as the inlet, a bellows upon which the valve is mounted, the bellows being in the housing to receive on one side, and to respond to pressures in the housing, and to compress and open the valve upon increase in such pressures; resilient means opposing the opening of the valve; and additional means to apply opening forces to the valve, including a pressure chamber on the opposite side of the bellows, an atmospheric bleed line to the chamber, an open tube connecting into the chamber and adapted for connection to a source of vacuum, and a valve in the tubing.

9. The combination of claim 8, wherein the last-named valve is a manually adjustable, throttling valve.

10. The combination of claim 8, wherein the pressure chamber includes a diaphragm larger than the bellows, so that unit changes in vacuum can have a larger effect on the valve than do unit changes in housing pressure.

11. The combination of claim 10, wherein the resilient means includes a spring and means to adjust the force thereof.

12. In a refrigeration system, having a compressor, a condenser, an expansion device, an evaporator, and piping connecting them in circuit in that order; a regulator valve in the low pressure pipe leading into the compressor, the valve comprising a housing having an inlet, an outlet and a valve seat therebetween, a valve plug cooperable with the valve seat; yieldable means acting to close the valve; an expansible mechanism connected to the valve with a flexible sealing wall exposed to the interior of the housing so as to cause the valve to open against the yieldable means upon rise in pressure within the housing, the flexible wall and the yieldable means being adapted to cause the valve to begin to throttle when the pressure in the housing reduces below a predetermined value, and the relative size of the outlet and the flexible wall being such as to render the movement of the valve subject to changes in rate of flow through the valve; and mechanism actuatable to reduce the closing force acting on the valve and to reduce the aforesaid predetermined pressure at which the valve begins to close, said mechanism including a source of fluid under variable pressure different from the pressure within the housing, and means connecting it to the expansible mechanism on the side thereof opposite to the one exposed to the interior of the housing, to increase the closing forces on the valve with increase of the fluid pressure.

13. The system of claim 12, wherein the fluid pressure operated means has a piping to a vacuum source; temperature-operated means and a valve operated by the temperature-responsive means, located in the piping, to connect the vacuum to the pressure-operated means when the temperature of the space is above a predetermined value.

14. A refrigeration control valve, including a housing having an inlet, an outlet, a valve seat between them, and a valve movable toward and from the valve seat; the outlet and the valve seat being at least substantially as large as the inlet, a bellows upon which the valve is mounted, the bellows being in the housing to respond to pressures therein, and to compress and open the valve upon increase in such pressures; resilient means opposing the opening of the valve; and additional means to apply opening forces to the valve, including a pressure chamber of which the bellows is a part, the pressure therein acting oppositely upon the bellows to the housing pressure, an atmospheric connection to the chamber, an open tube connection into the chamber and adapted for connection to a source of sub-atmospheric pressure, and a valve in one of said connections.

15. The refrigeration control valve of claim 14, wherein the valve is in the atmospheric connection and wherein there is a constriction in the connection to the vacuum source.

16. The control valve of claim 15, wherein the valve in the connection is a manually adjustable valve to change the size of the connection to atmosphere.

References Cited in the file of this patent

UNITED STATES PATENTS

| | | |
|---|---|---|
| 1,780,442 | Schmieding | Nov. 4, 1930 |
| 2,155,516 | Tull et al. | Apr. 25, 1939 |
| 2,215,327 | Karsten | Sept. 17, 1940 |
| 2,532,568 | Myers | Dec. 5, 1950 |
| 2,618,290 | Van Vliet | Nov. 18, 1952 |
| 2,734,346 | Dickieson | Feb. 14, 1956 |
| 2,766,593 | Mitchell | Oct. 16, 1956 |